(12) United States Patent
Bansal et al.

(10) Patent No.: US 10,671,931 B2
(45) Date of Patent: Jun. 2, 2020

(54) PREDICTIVE MODELING ACROSS MULTIPLE HORIZONS COMBINING TIME SERIES AND EXTERNAL DATA

(71) Applicant: Microsoft Technology Licensing, LLC, Redmond, WA (US)

(72) Inventors: Gagan Bansal, Sunnyvale, CA (US); Amita Surendra Gajewar, Sunnyvale, CA (US); Debraj GuhaThakurta, Bellevue, WA (US); Konstantin Golyaev, Lake Forest Park, WA (US); Mayank Shrivastava, Kirkland, WA (US); Vijay Krishna Narayanan, Mountain View, CA (US); Walter Sun, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 725 days.

(21) Appl. No.: 15/178,445

(22) Filed: Jun. 9, 2016

(65) Prior Publication Data
US 2017/0220939 A1    Aug. 3, 2017

Related U.S. Application Data

(60) Provisional application No. 62/289,049, filed on Jan. 29, 2016.

(51) Int. Cl.
*G06N 5/04* (2006.01)
*G06N 20/00* (2019.01)
(Continued)

(52) U.S. Cl.
CPC .............. *G06N 5/04* (2013.01); *G06N 20/00* (2019.01); *G06Q 10/04* (2013.01); *G06Q 10/10* (2013.01); *G06Q 50/10* (2013.01)

(58) Field of Classification Search
CPC .......... G06N 5/04; G06N 20/00; G06N 9/005; G06Q 10/04; G06Q 10/10; G06Q 50/10
(Continued)

(56) References Cited

U.S. PATENT DOCUMENTS

| 6,928,398 B1 | 8/2005 | Fang et al. |
| 8,401,927 B2 | 3/2013 | Fuxman et al. |

(Continued)

FOREIGN PATENT DOCUMENTS

| CN | 104700152 CN | 10/2015 |
| WO | 2014071023 | 5/2014 |

OTHER PUBLICATIONS

International Search Report and the Written Opinion issued in PCT application No. PCT/US2017/014004 dated Mar. 14, 2017.
(Continued)

*Primary Examiner* — Shane D Woolwine
(74) *Attorney, Agent, or Firm* — Workman Nydegger

(57) ABSTRACT

A multi-horizon predictor system that predicts a future parameter value for multiple horizons based on time-series data of the parameter, external data, and machine-learning. For a given time horizon, a time series data splitter splits the time into training data corresponding to a training time period, and a validation time period corresponding to a validation time period between the training time period and the given horizon. A model tuner tunes the prediction model of the given horizon fitting an initial prediction model to the parameter using the training data thereby using machine learning. The model tuner also tunes the initial prediction model by adjusting an effect of the external data on the prediction to generate a final prediction model for the given horizon using the validation data. A multi-horizon predictor causes the time series data splitter and the model tuner to operate for each of multiple horizons.

20 Claims, 3 Drawing Sheets

(51) Int. Cl.
*G06Q 10/10* (2012.01)
*G06Q 50/10* (2012.01)
*G06Q 10/04* (2012.01)

(58) Field of Classification Search
USPC .......................................................... 706/12
See application file for complete search history.

(56) References Cited

U.S. PATENT DOCUMENTS

| | | | |
|---|---|---|---|
| 2008/0162487 A1 | 7/2008 | Richter | |
| 2009/0248490 A1 | 10/2009 | Moncreiff | |
| 2010/0114654 A1 | 5/2010 | Lukose et al. | |
| 2010/0161471 A1 | 6/2010 | Fendick | |
| 2011/0004509 A1 | 1/2011 | Wu et al. | |
| 2012/0197856 A1* | 8/2012 | Banka | H04L 67/12 707/706 |
| 2012/0303411 A1 | 11/2012 | Chen et al. | |
| 2014/0229234 A1* | 8/2014 | Yan | G06Q 30/02 705/7.31 |
| 2014/0303953 A1 | 10/2014 | Bates | |
| 2014/0344186 A1 | 11/2014 | Nadler | |
| 2015/0088790 A1* | 3/2015 | Chidlovskii | G06Q 30/0202 706/12 |
| 2015/0134410 A1* | 5/2015 | Bendel | G06Q 30/0201 705/7.31 |
| 2015/0186792 A1* | 7/2015 | Chidlovskii | G06Q 50/26 706/12 |
| 2015/0339416 A1 | 11/2015 | Dannecker et al. | |
| 2017/0193371 A1* | 7/2017 | Shen | G06N 5/04 |

OTHER PUBLICATIONS

"How Google Cloud Platform works", Retrieved on: Feb. 17, 2016 Available at: https://cloud.google.com/.
"What is Google Cloud Monitoring", Retrieved on: Feb. 17, 2016 Available at: https://cloud.google.com/monitoring/docs.
"Crystal", Retrieved on: Feb. 17, 2016 Available at: https://crystal.predictivelayer.com/#!/.
"Crystal automated machine learning platform", Retrieved on: Feb. 17, 2016 Available at: http://www.predictelayer.com/automated-machine-learning-products.
Furman, Yoel., "VAR Estimation with the Adaptive Elastic Net", Published on: Jun. 18, 2014 Available at: http://papers.ssrn.com/sol3/papers.cfm?abstract_id=2456510.
Xiao, et al., "A hybrid model for time series forecasting", In Journal of Human Systems Management, vol. 31, No. 2, Jan. 2012, pp. 1-2.
Second Written Opinion issued in PCT Patent Application No. PCT/US2017/014004 dated Jun. 27, 2017.
"International Preliminary Report on Patentability issued in PCT Application No. PCT/US2017/014004", dated Sep. 26, 2017, 9 Pages.
"Office action Issued in European Patent Application No. 17703009.5", dated Jul. 11, 2019, 4 pages.

* cited by examiner

PREDICTIVE MODELING ACROSS MULTIPLE HORIZONS COMBINING TIME SERIES AND EXTERNAL DATA

CROSS-REFERENCE TO RELATED APPLICATION

This application claims the benefit of U.S. Provisional Patent Application Ser. No. 62/289,049 filed Jan. 29, 2016, which provisional patent application is incorporated herein by reference in its entirety.

BACKGROUND

Computers and networks have ushered in what has been called the "information age". There is a massive quantity of data available that can assist users in doing a variety of tasks, including making predictions regarding a future value of a parameter. For instance, by performing regression analysis on time series data of a parameter, predictions can be made about future time series of the data. Such predictions may be performed for any of a variety of reasons including, for instance, anticipating power usage within a data center, predicting network traffic over a certain channel, predicting processor usage, estimating future world surface temperatures, and so forth. By accurately predicting future values of such parameters, appropriate preparations can be made to respond to anticipated future change.

However, it represents an extremely difficult technical challenge to predict how the future can affect something, especially when relying only upon the time series data from the past alone. Accordingly, there are conventional mechanism that improve predictive technique by factoring in knowledge of periodic fluctuations. There are also conventional mechanisms that factor in external factors that are distinct from the time series data and the parameter, but nevertheless may have some influence upon that parameter.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate a multi-horizon predictor system that predicts a future value of a parameter for multiple horizons based on time-series data of the parameter, external data, and machine-learning. For a given time horizon, a time series data splitter splits time series data of a parameter into training data corresponding to a training time period prior to the given horizon, and a validation time period corresponding to a validation time period between the training time period and the given horizon. A model tuner tunes the prediction model of the given horizon fitting an initial prediction model to the parameter using the training data thereby using machine learning. The model tuner also tunes the initial prediction model by adjusting an effect of the external data on the prediction to generate a final prediction model for the given horizon using the validation data. A multi-horizon predictor causes the time series data splitter and the model tuner to operate for each of multiple horizons.

Accordingly, there may be a different tuning and thus a different final prediction model used for each of at least some of the multiple time horizons. Thus, effect of external data may be different depending on the time horizon. As an example, the external data may be data that is more relevant for shorter term time horizons, and much less relevant to long term time horizons. The predictor may operate frequently to constantly update the multi-horizon prediction as external data changes. For instance, the external data may be processed web data that changes regularly. An event indicating that the web data has changed could result a rerunning of the multi-horizon prediction system. Thus, more accurate multi-horizon predictions may be obtained for multiple horizons, with such predictions adjusting as circumstances (i.e., the parameter values) change.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
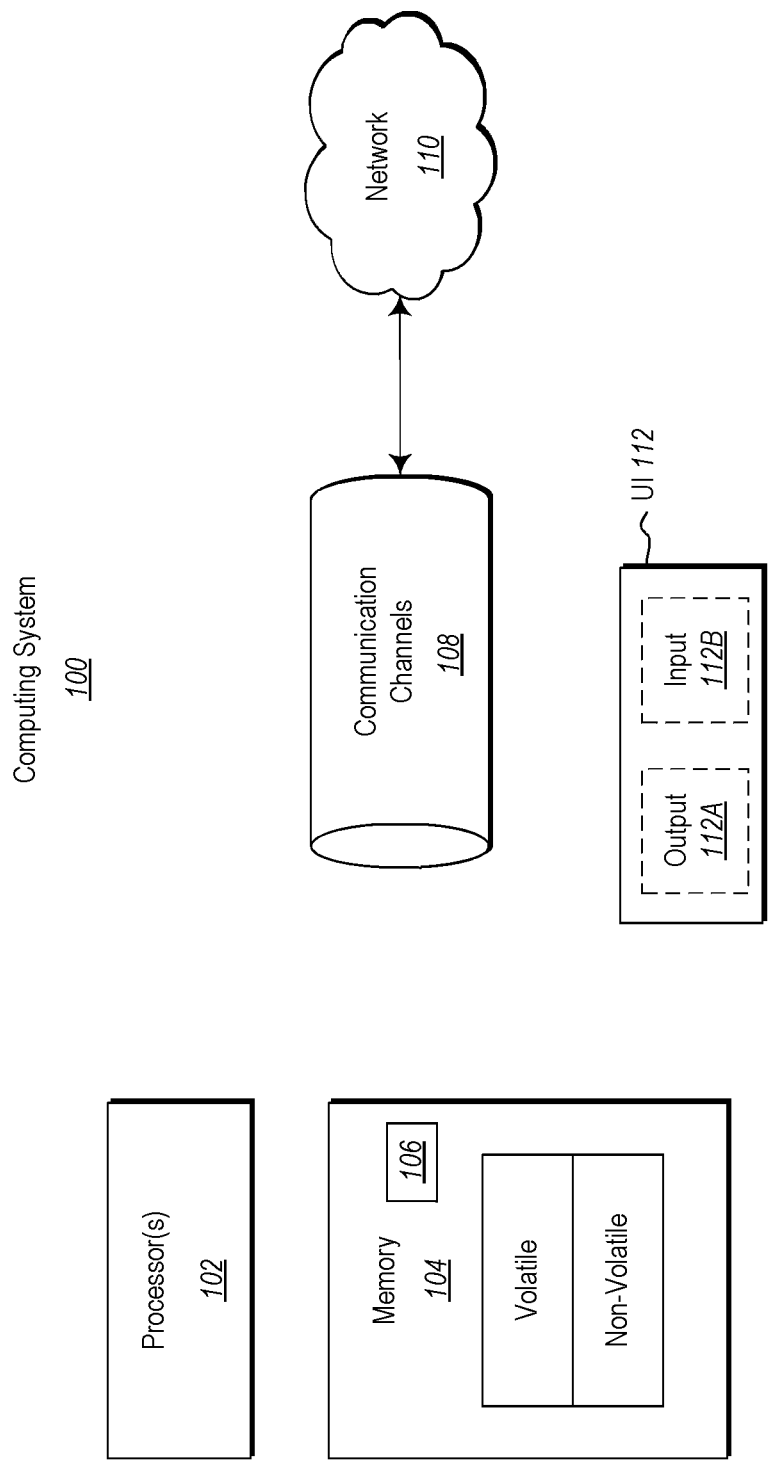
FIG. 1 illustrates an example computing system in which the principles described herein may be employed.

At least some embodiments described herein relate a multi-horizon predictor system that predicts a future value of a parameter for multiple horizons based on time-series data of the parameter, external data, and machine-learning. For a given time horizon, a time series data splitter splits time series data of a parameter into training data corresponding to a training time period prior to the given horizon, and a validation time period corresponding to a validation time period between the training time period and the given horizon. A model tuner tunes the prediction model of the given horizon fitting an initial prediction model to the parameter using the training data thereby using machine learning. The model tuner also tunes the initial prediction model by adjusting an effect of the external data on the prediction to generate a final prediction model for the given horizon using the validation data. A multi-horizon predictor causes the time series data splitter and the model tuner to operate for each of multiple horizons.

Accordingly, there may be a different tuning and thus a different final prediction model used for each of at least some of the multiple time horizons. Thus, effect of external data may be different depending on the time horizon. As an example, the external data may be data that is more relevant for shorter term time horizons, and much less relevant to long term time horizons. The predictor may operate frequently to constantly update the multi-horizon prediction as external data changes. For instance, the external data may be processed web data that changes regularly. An event indicating that the web data has changed could result a rerunning of the multi-horizon prediction system. Thus, more accurate multi-horizon predictions may be obtained for multiple horizons, with such predictions adjusting as circumstances (i.e., the parameter values) change.

Some introductory discussion of a computing system will be described with respect to FIG. 1. An example structure and operation of the multi-horizon predictor will thereafter be described with respect to Figures through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some interfacing with a user. The user interface 112 may include output mechanisms 112A as well as input mechanisms 112B. The principles described herein are not limited to the precise output mechanisms 112A or input mechanisms 112B as such will depend on the nature of the computing system 100. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
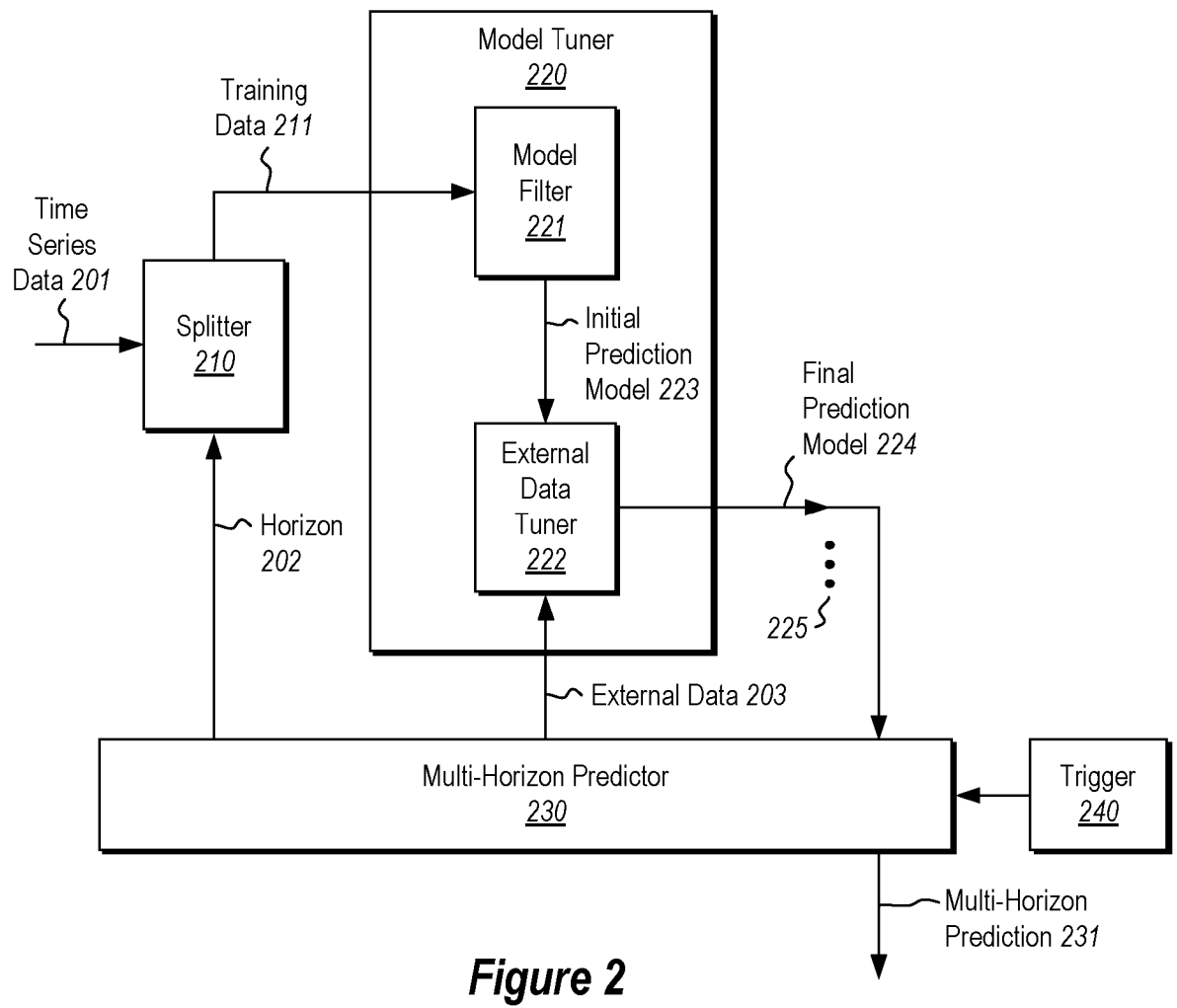
FIG. 2 illustrates a computing system that automatically predicts a future value of a parameter for multiple horizons based on time-series data of the parameter, external data, and machine-learning.

FIG. 2 illustrates a computing system 200 that automatically predicts a future value of a parameter for multiple horizons based on time-series data of the parameter, external data, and machine-learning. The computing system 200 includes a time series data splitter 210, a model tuner 220, a multi-horizon predictor 230, and a prediction trigger 240, each of which may be structured as described above for the executable component 106 of FIG. 1. As an example, the computing system 200 may be the computing system 100 of FIG. 1.

The time series data splitter 210 receives time series data 201 of a parameter and an identified horizon 202. When a prediction for the identified horizon is to occur, the time series data splitter 210 splits the parameter time series data into training data 211 corresponding to a training time period prior to the identified horizon, and validation data 212 corresponding to a validation time period for the identified horizon 202.

Figure 3:
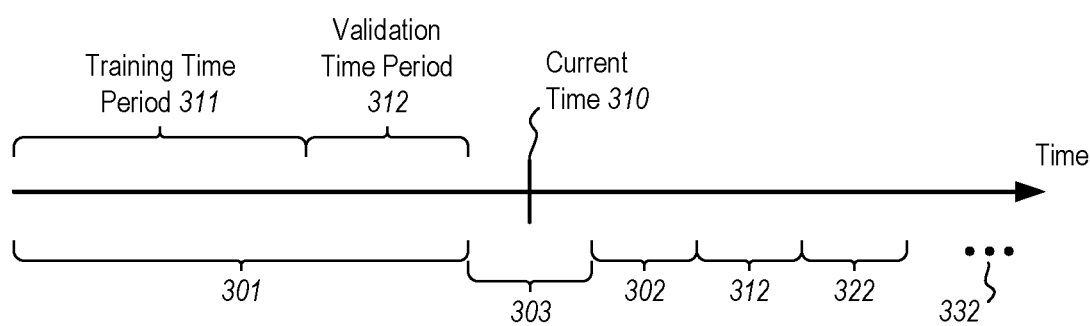
FIG. 3 illustrates time progress represented by a time progress timeline that has a time marker at the current time.

For instance, FIG. 3 illustrates time progress 300 represented by a time progress timeline that has a time marker at the current time 310. The time series data may be time series data spread over time period 301 and represents values of the parameter that have occurred prior to the current time 310. The time horizon 302 for predicting the values of the parameters is representing as occurring after the current time 310. The time series data is split into the training data corresponding to time period 311 and the validation data corresponding time period 312. The time period 312 represented by the validation data is after the time period 311 represented by the training data 311, and before the time horizon 302. While there is illustrated a time separation 303 between the time period 301 represented by the time series and the time series 303, that need not be the case. The granularity of the time period 301 and the horizon 302 may depend on the nature of the parameter. As an example, the time period 301 and horizons may be on the order of years, quarters, months, weeks, days, hours, and even minutes.

A model tuner 220 tunes a prediction model of the identified horizon by performing at least two things with respect to that given horizon. First, as represented by the action of the model fitter 221, the model tuner 220 fits an initial prediction model to the parameter using the training data 211 thereby using machine learning to select the initial prediction model as represented by arrow 223. Such machine learning mechanisms could include, for instance, elastic net regression or gradient boosted regression trees. Examples of the initial prediction model could involve regression models.

Also, as represented by external data tuner 222, the model tuner 220 tunes the initial prediction model by adjusting an effect of external data 203 on the prediction to generate a final prediction model for the given horizon using the validation data 212. The generation of a final prediction model for the given horizon is represented by the arrow 224. According, the model tuner adjusts using external data to allow for more accurate predictions given a particular time horizon.

A multi-horizon predictor 230 causes the time series data splitter 210 and the model tuner 220 to operate for each of multiple horizons to obtain the final prediction model for each of the multiple horizons (as represented by ellipses 225). The multi-horizon predictor 230 also may facilitate the providing of the time series data 201 and the horizon 202 to the time series data splitter 210, and provide external data 203 to the model tuner 220.

There may be a different tuning and thus a different final prediction model used for each of at least some of the multiple horizons. For instance, in FIG. 2, there is time horizon 302, but there are also time horizons 312 and 322, and potentially more as represented by the ellipses 332. The multi-horizon predictor 230 may gather each result of the final prediction models for each of the multiple horizons to thereby generate a multi-horizon prediction (as represented by arrow 231).

In some embodiments, the model tuner 220 keeps the same initial prediction model for each of the prediction models for each horizon of a single multi-horizon prediction. This allow the time splitter 210 and the model fitter 221 to avoid having to redo work for each subsequent horizon of the multiple horizons in a single multi-horizon prediction. However, the principles described herein are not limited to the model tuner 220 using the same initial prediction model for each of the prediction models for each horizon of a single multi-horizon prediction.

Furthermore, the external data tuner 222 may use the same validation data to tune towards the final prediction model for each of the horizons in the multi-horizon prediction results. However, the effect of the external data may change for each horizon. For instance, external data that has higher shorter term relevance may have a greater effect on the final prediction model for shorter term horizons than for longer term horizons. In alternative embodiments, the external data tuner 222 may use different validation data to tune towards the final prediction model for at least one of the horizons in the multi-horizon prediction results.

Finally, the machine learning training may be performed once for a given multi-horizon prediction result in order to generate the initial prediction model. However, in other embodiments, the machine learning training may be redone using a different split of the time series data for the parameter. It is particularly efficient, however, (for a given multi-horizon prediction result) to perform machine learning once to fit an initial prediction model to the training data, and then to use the same validation data to use in conjunction with external data to tune to the final prediction model for each horizon in the multi-horizon prediction result.

The prediction trigger 240 causes the multi-horizon prediction model to redo the multi-horizon prediction. For instance, the multi-horizon prediction may be done periodically and/or in response to the detection of one or more events. As an example, the prediction may be performed at a regular cadence such as daily or weekly to provide a frequently updated rolling prediction of values of important parameters. As another example, the event that triggers the prediction might be that the external data itself has changed. When the multi-horizon prediction is re-performed, the prediction may be based on shifted time series data produced by the time series data splitter.

The principles described herein apply regardless of the parameter of which future values are being predicted. The parameter represented by the time series data 201 could be any parameter and for which prediction provides usefulness. The parameter might include, for instance, resource usage data. As an example, it would represent an enormous technical advantage to be able to accurately predict the number of processing nodes, storage nodes, power usage, and so forth, based on pass resource usage.

The associated external data 203 used to tune the final prediction model may be any external data that could have impact on a future prediction. For instance, in the context of predicting future resource usage in a data center, weather forecasts may even have impact. For instance, if there is light rain forecast for a given region, then this might mean outside activities might be more restricted, and there might be more people in that region that might tend to use indoor computing systems. This could mean that more resources may be in demand for a datacenter within that region.

If a category 5 hurricane is in the forecast, then this could mean that individuals from far and wide might be using news services in order to keep up with the news. It could also mean an increase in big processing associated with various entities using complex processing-intensive models in order to predict the path and emergent strength of the hurricane. Thus, predictions may be updated based not just on time series data of resource usage, but may also take into account such external factors.

The parameter for prediction might also include product flow data such as manufacturing levels, distribution levels, sales levels, and so forth. External data 203 that could be helpful in predicting such flows. Such external data could include investments made in manufacturing, distribution and sales. In some embodiments, the tuning of the final prediction model may involve multiple types of external data. There may be multiple types of external data that have impact on the prediction of values of certain parameters.

In the context of predicting product flows, macroeconomic data may also be relevant such as gross domestic product, inflation rates, oil prices, unemployment, and the like. Also, consumer opportunity data (e.g., collective notes taken by field sales forces) may also be relevant to predict product flows. Scheduled events may also be of relevance (such as a product launch, an election, a press release or the like). Search engine queries may also be relevant. For instance, more search requests for a particular product may trend the prediction towards higher levels of product production in the near future. Social media entries regarding a product may also have correlation with future manufacturing. The weighting of each external factor may be different for each of the multiple horizons. Furthermore, there may be dynamically changing correlations between the different types of external data that are taken into consideration in the prediction.

The external data 203 might be data originating remotely from the computing system 200. For instance, the external data 203 may be data provided and updated by a web service, such as processed web data. Even if that processed web data is updated frequently, the computing system 200 may re-perform the multi-horizon prediction due to the efficiency with which the computing system 200 operates to perform the prediction.

The external data 203 may itself be a prediction based on time series data. For instance, the external data 203 might be a prediction of unemployment for a particular future period of time based on time series data of unemployment. The prediction that generates the external data 203 may even be a prediction that likewise using machine learning and external data using the principles described herein. Accordingly, the principles described herein may also ensure more accurate availability of external data in the form of future predictions. That further has the potentially of improving the accuracy of the predictions that use those predictions of external data as input.

The parameter for predicting future values might also be specific to a geographic region. In that case, the external data might be specific to the geographic region. For instance, the external data 203 in that case may include geo-specific features. For instance, predictions of distribution of a product in a particular region may be affected by the presence of a mountain range that divides the region, and over which there are limited distribution channels.

Figure 4:
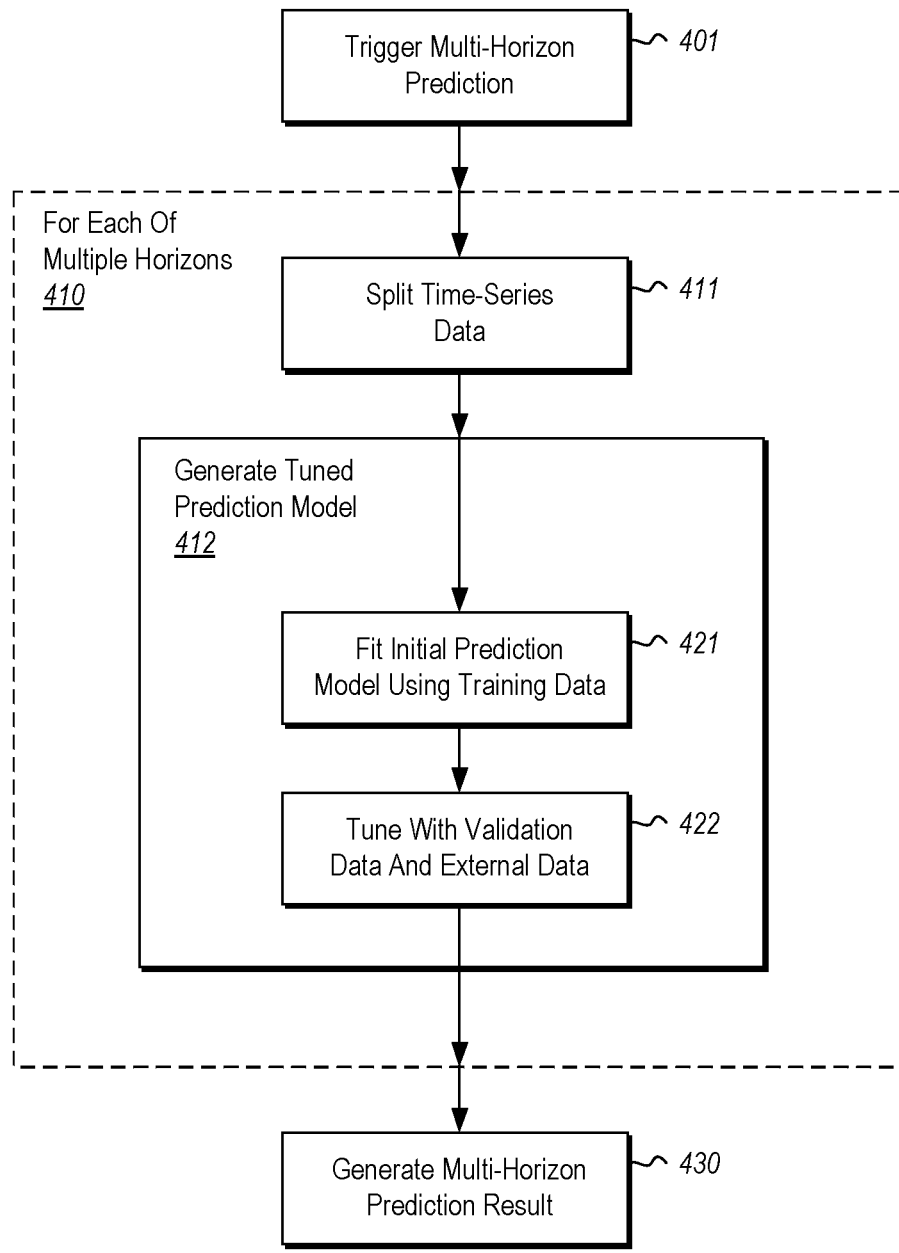
FIG. 4 illustrates a flowchart of a method for automatically predicting a future value of a parameter for multiple horizons based on time-series data of the parameter, external data, and machine-learning.

FIG. 4 illustrates a flowchart of a method 400 for automatically predicting a future value of a parameter for multiple horizons based on time-series data of the parameter, external data, and machine-learning. First, the performance of the multi-horizon prediction is triggered (act 401). The content of box 410 is then performed for each of multiple horizons.

Specifically, a time series data splitter (e.g., the time series data splitter 210 of FIG. 2) splits time series data of a parameter into training data corresponding to a training time period prior to the given horizon, and a validation time period corresponding to a validation time period between the training time period and the given horizon (act 411). The model tuner then tunes a prediction model for the given horizon (act 412) by 1) fitting an initial prediction model to the parameter using the training data thereby using machine learning (act 421), and tuning the initial prediction model by adjusting an effect of the external data on the prediction to generate a final prediction model for the given horizon using the validation data (act 422). The adjusting allows for a prediction that accounts for the external data; and there being a different tuning and thus a different final prediction model used for each of at least some of the plurality of horizons.

The multi-horizon predictor then uses the final prediction models for each of the horizons to generate a multi-horizon prediction result (act 430). The principles described herein thus provide an efficient mechanism for providing a multi-horizon prediction. The mechanism is so efficient that the prediction can be easily re-performed periodically and/or in response to changing events. Furthermore, the predictions are performed using complex information, including time series data, as well as external data, with tuning that is unaffected by errors and biases that are prone in human judgment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that automatically predicts a future value of a parameter for multiple horizons, each horizon comprising a future term comprising a period of time, based on time-series data of the parameter, external data, and machine-learning, the computing system comprising:
    a time series data splitter that, for a given horizon, splits time series data of a parameter into training data corresponding to a training time period prior to the given horizon, and a validation time period corresponding to a validation time period between the training time period and the given horizon;
    a model tuner that tunes a prediction model of the given horizon by performing the following for the given horizon:
        fitting an initial prediction model to the parameter using the training data, thereby using machine learning;
        tuning the initial prediction model by adjusting an effect of the external data on the prediction, wherein the external data comprises data that are distinct from the time series data and the parameter; and
        using the adjusted initial prediction model to generate a final prediction model for the given horizon using the validation data, such that the prediction accounts for the external data; and
    a multi-horizon predictor that causes the time series data splitter and the model tuner to operate for each a plurality of horizons, using both a different tuning and a corresponding different final prediction model for each of at least some of the plurality of horizons, to generate a single multi-horizon prediction result comprising predictions for multiple horizons where each horizon comprises a future term comprising a period of time.

2. The system in accordance with claim 1, the multi-horizon predictor keeping the same initial prediction model for each of the plurality of horizons.

3. The system in accordance with claim 1, the multi-horizon predictor changing the initial prediction model for at least one of the plurality of horizons.

4. The system in accordance with claim 1, the external data comprising data originating remotely from the computing system.

5. The system in accordance with claim 1, the external data comprising changing external data, the system further comprising:
    an external data change detection component that causes the multi-horizon predictor to redo the multi-horizon prediction in response to at least some changes in the external data.

6. The system in accordance with claim 1, the multi-horizon prediction model periodically redoing the multi-horizon prediction based on shifted time series data produced by the time series data splitter.

7. The system in accordance with claim 6, the multi-horizon prediction model periodically redoing the multi-horizon prediction also based on updated external data.

8. The system in accordance with claim 1, the parameter comprising a resource usage parameter.

9. The system in accordance with claim 1, the parameter comprising a product flow parameter.

10. The system in accordance with claim 1, the external data comprising a prediction value also predicted using a time series.

11. The system in accordance with claim 1, the external data comprising macroeconomic data.

12. The system in accordance with claim 1, the external data comprising at least two different types of data.

13. The system in accordance with claim 1, the external data comprising a scheduled event.

14. The system in accordance with claim 1, the external data comprising weather forecast data.

15. The system in accordance with claim 1, the external data comprising search engine query data.

16. The system in accordance with claim 1, the external data comprising customer opportunity data.

17. The system in accordance with claim 1, the parameter being specific to a geographic region.

18. The system in accordance with claim 1, the external data comprising data regarding the geographic region.

19. A method for automatically predicting a future value of a parameter for multiple horizons based on time-series data of the parameter, external data comprising data that are distinct from the time-series data and the parameter, and machine-learning, the method comprising:

for each of multiple horizons, each horizon comprising a future term comprising a period of time, performing the following to generate a single multi-horizon prediction result comprising predictions for multiple horizons:
splitting time series data of a parameter, for a given horizon, into training data corresponding to a training time period prior to the given horizon, and a validation time period corresponding to a validation time period between the training time period and the given horizon; and
tuning a prediction model of the given period by performing the following for the given horizon:
fitting an initial prediction model to the parameter using the training data thereby using machine learning; and
tuning the initial prediction model by adjusting an effect of the external data on the prediction to generate a final prediction model for the given horizon using the validation data, the adjusting allowing for a prediction that accounts for the external data.

20. A computer program product comprising one or more computer-readable hardware storage media having thereon computer-executable instructions that are structured such that, when executed by one or more processors of a computing system, cause the computing system to perform a method for automatically predicting a future value of a parameter for multiple horizons based on time-series data of the parameter, external data, and machine-learning, the method comprising:

for each of multiple horizons, each horizon comprising a future term comprising a period of time, performing the following to generate a single multi-horizon prediction result comprising predictions for multiple horizons:
splitting time series data of a parameter, for a given horizon, into training data corresponding to a training time period prior to the given horizon, and a validation time period corresponding to a validation time period between the training time period and the given horizon; and
tuning a prediction model of the given period by performing the following for the given horizon:
fitting an initial prediction model to the parameter using the training data thereby using machine learning; and
tuning the initial prediction model by adjusting an effect of the external data on the prediction to generate a final prediction model for the given horizon using the validation data, the adjusting allowing for a prediction that accounts for the external data.

* * * * *